US009111056B2

(12) United States Patent
Hong et al.

(10) Patent No.: US 9,111,056 B2
(45) Date of Patent: Aug. 18, 2015

(54) METHOD AND APPARATUS OF FLUID SIMULATION

(71) Applicant: Dongguk University Industry-Academic Cooperation Foundation, Seoul (KR)

(72) Inventors: Jeong-Mo Hong, Seoul (KR); Jae-Gwang Lim, Seoul (KR); Bong-Jun Kim, Gyeonggi-do (KR)

(73) Assignee: Dongguk University Industry-Academic Cooperation Foundation, Seoul (KR)

( * ) Notice: Subject to any disclaimer, the term of this patent is extended or adjusted under 35 U.S.C. 154(b) by 0 days.

(21) Appl. No.: 14/168,314

(22) Filed: Jan. 30, 2014

(65) Prior Publication Data

US 2015/0205889 A1    Jul. 23, 2015

(30) Foreign Application Priority Data

Jan. 20, 2014    (KR) .......................... 10-2014-0006947

(51) Int. Cl.
*G06F 17/50*    (2006.01)
*G06G 7/57*    (2006.01)

(52) U.S. Cl.
CPC .............. *G06F 17/5009* (2013.01); *G06G 7/57* (2013.01)

(58) Field of Classification Search
USPC ................................. 703/2, 6, 9, 10; 434/126
See application file for complete search history.

(56) References Cited

U.S. PATENT DOCUMENTS

| 7,565,276 | B2 * | 7/2009 | Song et al. ........................ 703/2 |
| 2007/0239414 | A1 * | 10/2007 | Song et al. ........................ 703/9 |
| 2010/0250213 | A1 * | 9/2010 | Kim et al. ......................... 703/9 |

OTHER PUBLICATIONS

S. Osher and R. Fedkiw, "Level Set Methods and Dynamic Implicit Surfaces", Springer Verlag, 2003, Applied Mathematical Sciences vol. 153., 259 total pages.
H. Zhao, "A Fast Sweeping Method for Eikonal Equations," Mathematics of Computation, 2005, vol. 74, No. 250, pp. 603-627.
A. J. Chorin, "A Numerical Method for Solving Incompressible Viscous Flow Problems", Journal of Computational Physics, vol. 2, No. 1, pp. 12-26, 1967.
D. Adalsteinsson and J. A. Sethian, "The Fast Construction of Extension Velocities in Level Set Methods", Journal of Computational Physics, vol. 148, No. 1, pp. 2-22, 1999.

* cited by examiner

*Primary Examiner* — Thai Phan
(74) *Attorney, Agent, or Firm* — Grossman Tucker Perreault & Pfleger, PLLC (57) ABSTRACT

A fluid simulation method and apparatus is provided. The fluid simulation method according to an embodiment of the present invention comprises setting initial conditions of level set and velocity field for a simulation object and setting FLIP particles according to the set initial condition of the level set and the set initial condition of the velocity field; updating the level set and the velocity field by advection of the level set and the velocity field; reconstructing the updated level set and the updated velocity field; redeploying the FLIP particles for the simulation object; projecting the updated velocity field to have incompressibility; and updating velocity of each of the deployed particles.

10 Claims, 10 Drawing Sheets

Projection

1: $\mathbf{u}_{flip}(\mathbf{x}) = \mathbf{u}^\star(\mathbf{x})$
2: $\mathbf{u}(\mathbf{x}) = EulerianProjection(\mathbf{u}^\star(\mathbf{x}))$
3: $\mathbf{u}_{flip}(\mathbf{x}) = \mathbf{u}(\mathbf{x}) - \mathbf{u}_{flip}(\mathbf{x})$

FIG. 5

| Lagrangian advection |
|---|
| 1: for all particles $i$ do |
| 2: $\quad \phi_i \leftarrow \phi(\mathbf{p}_i)$ |
| 3: $\quad \mathbf{n}_i \leftarrow \nabla\phi(\mathbf{p}_i)/|\nabla\phi(\mathbf{p}_i)|$ |
| 4: $\quad$ if $i =$ FLIP then |
| 5: $\quad\quad \mathbf{u}_m \leftarrow \mathbf{u}(\mathbf{p}_i + \mathbf{u}(\mathbf{p}_i)\Delta t/2)$ |
| 6: $\quad\quad \mathbf{p}_i \leftarrow \mathbf{p}_i + \mathbf{u}_m \Delta t$ |
| 7: $\quad$ else |
| 8: $\quad\quad \mathbf{p}_i \leftarrow \mathbf{p}_i + \mathbf{u}_i \Delta t$ |
| 9: $\quad$ end if |
| 10: end for |

FIG. 6

| Update particle velocity |
|---|
| 1: for all particles $i$ do |
| 2:    if $i =$ Free then |
| 3:       $u_i \leftarrow u_i + g\Delta t$ |
| 4:    else if $i =$ FLIP then |
| 5:       $u_i \leftarrow u_i + \alpha_{flip} u_{flip}(p_i) + (1 - \alpha_{flip})u(p_i)$ |
| 6:    else if $i =$ PIC then |
| 7:       $u_i \leftarrow u(x)$ |
| 8:    else |
| 9:       $Delete(i)$ |
| 10:    end if |
| 11: end for |

Levelset Reconstruction

1: Initialize $w(\mathbf{x}), \bar{\mathbf{p}}(\mathbf{x}), \tilde{w}(\mathbf{x}), \tilde{\phi}(\mathbf{x})$ to 0
2: for all grid cell $\mathbf{x}$ do
3:     for all neighbor particle $i$ of $\mathbf{x}$ do
4:        $w(\mathbf{x}) \leftarrow w(\mathbf{x}) + UnitSplineKernel(\mathbf{p}_i, \mathbf{x})$
5:        $\bar{\mathbf{p}}(\mathbf{x}) \leftarrow \bar{\mathbf{p}}(\mathbf{x}) + w(\mathbf{x})\mathbf{x}$
6:     end for
7:     if $w(\mathbf{x}) > 0$ then
8:        $\bar{\mathbf{p}}(\mathbf{x}) \leftarrow \frac{\bar{\mathbf{p}}(\mathbf{x})}{w(\mathbf{x})}$
9:        $\phi_a \leftarrow |\mathbf{x} - \bar{\mathbf{p}}(\mathbf{x})| - r_0$
10:       $\mathbf{n}_a \leftarrow \frac{\mathbf{x} - \bar{\mathbf{p}}(\mathbf{x})}{|\mathbf{x} - \bar{\mathbf{p}}(\mathbf{x})|}$
11:       for all neighbor particle $i$ of $\mathbf{x}$ do
12:           $\tilde{w}(\mathbf{x}) \leftarrow \tilde{w}(\mathbf{x}) + (\frac{1}{\epsilon^2} + \frac{|\mathbf{x} - \bar{\mathbf{p}}(\mathbf{x})|}{r_0})^2$
13:           if $\phi_a > 0$ then
14:              $\tilde{w}(\mathbf{x}) \leftarrow \tilde{w}(\mathbf{x})max(0, \mathbf{n}_a \cdot \mathbf{n}_i)$
15:           end if
16:           $\tilde{\phi}(\mathbf{x}) \leftarrow \tilde{\phi}(\mathbf{x}) + min(\phi_i, \phi_0) - \mathbf{n}_i \cdot (\mathbf{p}_i - \mathbf{x})$
17:       end for
18:       if $\tilde{w}(\mathbf{x}) > 0$ then
19:          $\tilde{\phi}(\mathbf{x}) = \frac{\tilde{\phi}(\mathbf{x})}{\tilde{w}(\mathbf{x})}$
20:       end if
21:       $\alpha \leftarrow min(\frac{|\mathbf{u}(\mathbf{x})|}{u_{max}}, \alpha_{max})$
22:       $\phi(\mathbf{x}) \leftarrow (1 - \alpha)\phi(\mathbf{x}) + \alpha\tilde{\phi}(\mathbf{x})$
23:     end if
24: end for

FIG. 10

| Upsampled levelset reconstruction |
|---|
| 1: $\phi_{up}(\mathbf{x}) \leftarrow UpSampling(\phi(\mathbf{x}))$ |
| 2: $\mathbf{u}_{up}(\mathbf{x}) \leftarrow UpSampling(\mathbf{u}(\mathbf{x}))$ |
| 3: $\phi_{up}(\mathbf{x}) \leftarrow LevelsetReconstruction(\phi_{up}(\mathbf{x}), particle_{0...n})$ |
| 4: $\mathbf{u}(\mathbf{x}) \leftarrow DownSampling(\mathbf{u}_{up}(\mathbf{x}))$ |
| 5: $\phi(\mathbf{x}) \leftarrow DownSampling(\phi_{up}(\mathbf{x}))$ | ns, the researchers in the fluid simulation field have focused —

METHOD AND APPARATUS OF FLUID SIMULATION

CROSS REFERENCE TO RELATED APPLICATION

This application claims the benefit of Korean Patent Application No. 10-2014-0006947 filed on Jan. 20, 2014, entitled "Method and apparatus of fluid simulation", which is hereby incorporated by reference in its entirety into this application.

BACKGROUND OF THE INVENTION

1. Technical Field

The present invention relates to a fluid simulation method and apparatus and more particularly, to a fluid simulation method which allows productions of high-quality visual effect using a fluid implicit particle (FLIP)-level set hybrid method and an apparatus that can implement the method.

2. Description of the Related Art

Computer graphic-relating technologies have been applied to provide realistic images in high-efficient and low-cost productions of image and video contents. For example, highly detailed water motions are made by using the fluid simulation in order to express a large object's coming into and out of the water majestically in the background of the sea.

The fluid simulation has been already recognized as a basic and essential technology in visual effect (VFX) industries and used by artists to express realistic and colorful motions of fluid. However, since the fluid simulation is very complex and includes a large number of variables, it requires repetitive works while controlling such variables. It also takes tremendous efforts and time for such repetitive works since high-quality fluid simulation is generally very slow. For such reasons, the researchers in the fluid simulation field have focused on developing technologies to improve the quality and performance of the fluid simulation.

The fluid implicit particle (FLIP) has been widely used in VFX industries because FLIP-based simulation shows high performance with good visual quality. However, in large-scale fluid simulations, the efficiency is low because it requires many particles to represent large volume of water. Generally, grids with high resolution are used and the simulation is performed after deploying FLIP particles in the grids in order to simulate high-quality large-scale fluid. When it is assumed that a simulation space is half full with water in $512^3$ resolution condition and 8 particles are deployed per point of the grid, about 130 million particles have to be used. Treating of about 130 million particles requires high-end equipment and a long processing time so that using the FLIP technology is limited.

SUMMARY OF THE INVENTION

An object of the present invention is to provide a fluid simulation method which allows productions of high-quality visual effect using a fluid implicit particle (FLIP)-level set hybrid method and an apparatus that can implement the method.

In an aspect of the present invention, a fluid simulation method according to an embodiment of the present invention comprises: setting initial conditions of level set and velocity field for a simulation object and setting FLIP particles according to the set initial condition of the level set and the set initial condition of the velocity field; updating the level set and the velocity field by advection of the level set and the velocity field; reconstructing the updated level set and the updated velocity field; redeploying the FLIP particles for the simulation object; projecting the updated velocity field to have incompressibility; and updating velocity of each of the deployed particles.

The redeploying step may comprise dividing the simulation object into 4 regions and redeploying the FLIP particles for each region.

The 4 regions may be configured to include a first region which is an outside region affected by the gravity on the basis of the fluid surface, a second region which is formed inside the fluid surface as a layer having a constant distance from the fluid surface, a third region which is formed as a layer having a constant distance from the bottom of the second region, and a fourth region which is formed at the bottom of the third region.

FLIP particles may be deployed to the second region and be not deployed to the fourth region.

Each of the FLIP particles may have level set information.

The level set information may comprise a level set value, a derivative of the level set value and a velocity field value.

The updated level set and the updated velocity field may be reconstructed based on the level set information stored in the FLIP particle.

At the step of updating velocity, velocity of each of the deployed particles may be updated based on difference in the velocity of each FLIP particle between before and after the projection step.

In another aspect of the present invention, a computer readable recording medium is recorded with a program performing the fluid simulation method, the fluid simulation method comprising: setting initial conditions of level set and velocity field for a simulation object and setting FLIP particles according to the set initial condition of the level set and the set initial condition of the velocity field; updating the level set and the velocity field by advection of the level set and the velocity field; reconstructing the updated level set and the updated velocity field; redeploying the FLIP particles for the simulation object; projecting the updated velocity field to have incompressibility; and updating velocity of each of the deployed particles.

In another aspect of the present invention, a fluid simulation apparatus comprises a processor, the process: sets initial conditions of level set and velocity field for a simulation object; sets FLIP particles according to the set initial condition of the level set and the set initial condition of the velocity field; updates the level set and the velocity field by advection of the level set and the velocity field; reconstructs the updated level set and the updated velocity field; redeploys the FLIP particles for the simulation object; projects the updated velocity field to have incompressibility; and updates velocity of each deployed particle.

The fluid simulation method according to the present invention reduces numerical dissipation and loss associated with grid-based simulation and at the same time maintains smooth surface. The fluid simulation method according to the present invention also allows high quality of fluid simulation efficiently with low cost and with various types and multi-scale features.

BRIEF DESCRIPTION OF THE DRAWINGS

FIG. 9 illustrates an example of level set surface reconstruction.

DESCRIPTION OF THE EXEMPLARY EMBODIMENTS

While the present invention has been described with reference to particular embodiments, it is to be appreciated that various changes and modifications may be made by those skilled in the art without departing from the spirit and scope of the present invention, as defined by the appended claims and their equivalents.

Throughout the description of the present invention, when describing a certain technology is determined to evade the point of the present invention, the pertinent detailed description will be omitted. While such terms as "first" and "second," etc., may be used to describe various components, such components must not be limited to the above terms. The above terms are used only to distinguish one component from another.

It is to be appreciated that the description of one component is "connected" or "combined" to another component means that one component is connected or combined directly to another component or is also connected or combined by having another component in the middle.

A fluid simulation method according to an embodiment of the present invention is based on a grid-based method and a FLIP method. The fluid simulation method can compensate dissipation and loss caused with the grid-based method by using the FLIP method, and reduce use of many particles caused with the FLIP method by using the grid-based method.

The fluid simulation method according to an embodiment of the present invention deploys particles only near the surface of level set by improving the conventional FLIP method and utilizing the particle-level set method. It deploys particles only the inner region of the fluid surface and reconstructs level set and velocity field from the particles so that numerical dissipation and loss of the velocity field can be minimized. Further, the conventional particle-level set method reconstructs the level set only near surface of the level set where the particles are, while the fluid simulation method according to an embodiment of the present invention reconstructs the level set from the FLIP particles. Simulation space in the fluid simulation method according to an embodiment of the present invention is divided into several layers on the basis of the surface of the level set and each particle can move differently for each layer. Each particle can also have level set information in order to combine particles and the level set. The level set surface is then reconstructed by using the level set information which each particle has and an upsampling method can be applied during the reconstruction process of the level set surface.

The present invention will be described below in more detail with reference to the accompanying drawings, in which those components are rendered the same reference number that are the same or are in correspondence, regardless of the figure number, and redundant explanations are omitted.

Figure 1:
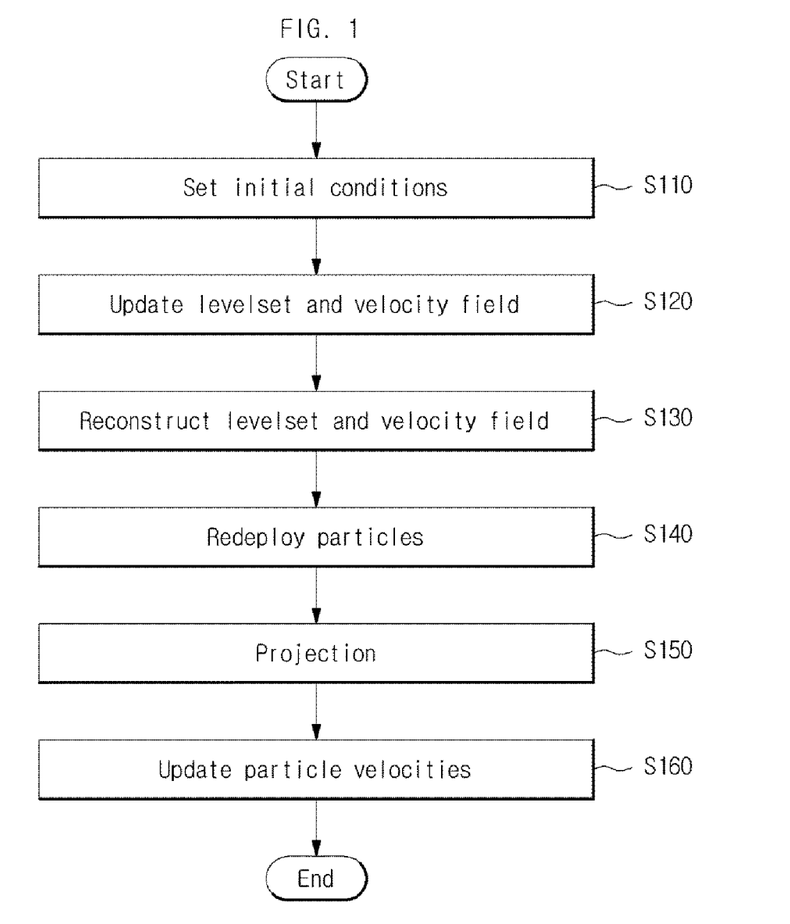
FIG. 1 is a flowchart illustrating a fluid simulation method according to an embodiment of the present invention.

FIG. 1 is a flowchart illustrating a fluid simulation method according to an embodiment of the present invention.

The fluid simulation method according to an embodiment of the present invention comprises setting initial conditions (S110), updating level set and velocity field (S120), reconstructing level set and velocity field (S130), redeploying particles (S140), projecting (S150) and updating particle velocity (S160).

The step of setting initial conditions in S110 is setting initial conditions for a simulation object. The initial conditions can be initial conditions of level set and velocity field for a simulation object. FLIP particles are then set according to the set initial conditions of level set and velocity field and a level set value, a derivative of level set value, and a velocity field value are stored in the set FLIP particles.

The step of updating level set and velocity field in S120 is a step for conducing advection of level set and velocity field. In the fluid simulation method according to an embodiment of the present invention, a semi-Lagrangian method can be used to conduct advection of level set and velocity field. FLIP particles can be advected by employing the first-order Euler or the second-order Runge-Kutta method.

The step of reconstructing the level set and the velocity field in S130 reconstructs the updated level set and the updated velocity field. A method to reconstruct the updated level set and the updated velocity field will be explained in detail below.

Then, after the simulation object is divided into a plurality of regions based on the fluid surface, the particles are redeployed for each region in S140. FLIP particles are deployed on the all regions with the conventional FLIP method since the FLIP particle does not have a level set value, while the FLIP particle has a level set value, a derivative of the level set value, a velocity field value and deploying of particles can vary according to the region in the fluid simulation method according to an embodiment of the present invention as described above. For example, in the fluid simulation method according to an embodiment of the present invention, it may not necessary to deploy particles in the inside fluid where visual accuracy is not important. Deploying particles will be explained in more detail below.

Projection step is a step of updating the velocity field of the fluid to have incompressibility. The projection may be a process of solving Navier-Stokes equation numerically. When fluid is added in the projection step, it may further comprise a sourcing step to generate additional level set and add the result to the fluid simulation.

The step of updating the particle velocity in S160 updates the velocity of the current particle based on the difference in the velocity field between before and after the projection step of S150. As described above, a velocity updating method can be applied to deploy different particles to each of a plurality of regions which are formed by being divided based on the fluid surface. It will be explained in more detail below.

A grid-based level set simulation method may be applied to the fluid simulation method according to an embodiment of the present invention. Fluid in the grid-based level set simulation method has non-viscosity and incompressibility, and motion of the fluid can be expressed with Navier-Stokes equations such as Equation 1 and Equation 2:

$$u_t + (u \cdot \nabla)u + \frac{\nabla p}{\rho} = f \quad \text{[Equation 1]}$$

$$\nabla \cdot u = 0 \quad \text{[Equation 2]}$$

wherein u is velocity, p is pressure, ρ is density, f is gravity or external force. $u^n$ is updated to $u^{n+1}$ for Δt.

Chorin's projection method may be applied to satisfy conditions of Equation 2 representing incompressibility and Equation 1 may be divided into Equation 3 and Equation 4.

$$\frac{u^* - u^n}{\Delta t} = -(u^n \cdot \nabla)u^n + f \quad \text{[Equation 3]}$$

$$\frac{u^{n+1} - u^*}{\Delta t} = -\frac{\nabla p}{\rho} \quad \text{[Equation 4]}$$

After defining $-(u^n \cdot \nabla)u^n$ and f, u* can be calculated in Equation 3 and then $u^{n+1}$ which satisfies incompressibility can be calculated from u* in Equation 4.

As described above, the semi-Lagrangian advection method may be applied to the advection process of the grid-based fluid simulation in the step of updating the level set and the velocity field of S120 in order to increase stability of the simulation. The fluid simulation method according to an embodiment of the present invention can minimize numerical dissipation and loss caused with the general grid-based fluid advection since values can be compensated through the advection of the FLIP particles.

A level set method is used in order to represent grid-based fluid in the fluid simulation method according to an embodiment of the present invention. More information regarding the level set method is described in 'S. Osher and R. Fedkiw, Level set methods and dynamic implicit surfaces. Springer Verlag, 2003, vol. 153'.

Level set method can provide movement by the velocity field u as in Equation 5 when grid points have distance φ to the fluid surface.

$$\phi_t + u \cdot \nabla \phi = 0 \quad \text{[Equation 5]}$$

For advection in the level set, the semi-Lagrangian method advection method is used to conduct advection by the velocity u only at the region of ±10Δx (Δx is an interval of one point). In this process, a distance φ value of the level set can be lost so that a fast sweeping method (FSM) is used to reconstruct the level set. More detailed information regarding FSM can be seen in 'H. Zhao, "A fast sweeping method for eikonal equations," Mathematics of computation, vol. 74, no. 250, pp. 603-627, 2005'.

$$n = \frac{\nabla \phi}{|\nabla \phi|} \quad \text{[Equation 6]}$$

Equation 6 is an equation to calculate normal of level set in which n is a vector perpendicular to the fluid surface (normal vector). Particles in the fluid simulation method according to an embodiment of the present invention can have normal vector information, n, of the level set and n is used to reconstruct the surface of the level set. Thus, the step of reconstructing the level set and the velocity field of S130 may include updating n by recalculating normal vector of the reconstructed level set.

FLIP is a method to minimize dissipation and loss caused during the fluid advection by employing the fluid advection of the PIC particle-based method, instead of that of the traditional grid-based method. In order to satisfy the incompressibility of fluid, velocity field is constructed by transferring FLIP velocities on a grid and incompressibility of the velocity field is maintained by using the Chorin's projection method. More detailed information regarding the Chorin's projection method can be seen in A. J. Chorin, 'A numerical method for solving incompressible viscous flow problems,' Journal of computational physics, vol. 2, no. 1, pp. 12-26, 1967.

Velocity is corrected at the velocity field, which represents the velocity changes after the projection from the original FLIP velocity, and applied onto the particles to maintain the incompressibility of the FLIP particles.

The fluid can be divided into a plurality of regions and particles can be deployed differently to each region.

Figure 2:
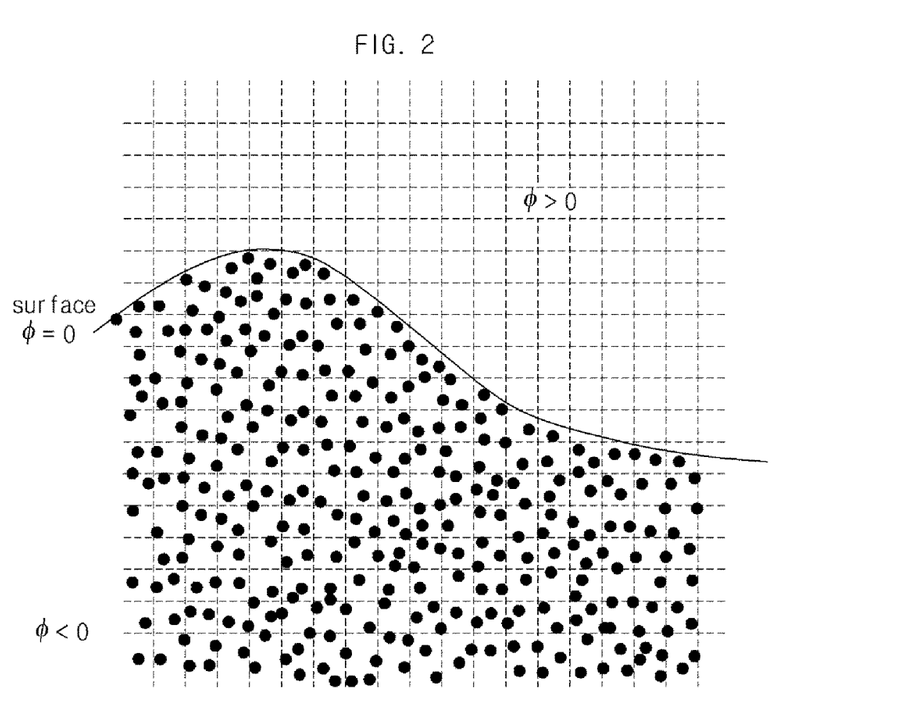
FIG. 2 illustrates a conventional method for deploying particles.
Figure 3:
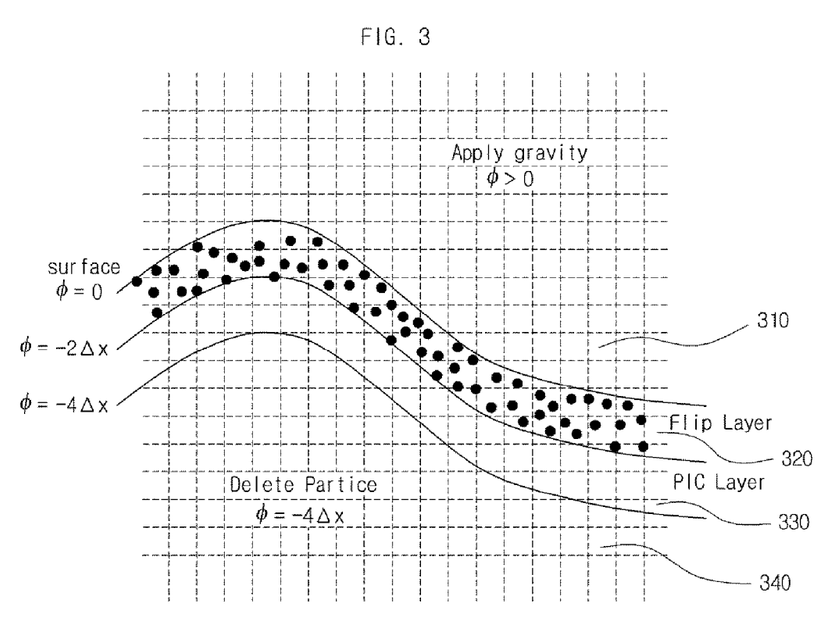
FIG. 3 illustrates a method for deploying particles in a fluid simulation method according to an embodiment of the present invention.

FIG. 2 illustrates a conventional method for deploying particles and FIG. 3 illustrates a method for deploying particles in a fluid simulation method according to an embodiment of the present invention.

Referring to FIG. 2, it is shown that fluid is divided into inside and outside based on the fluid surface and particles are deployed inside of the fluid surface.

On the contrary, fluid is divided into four layers, 310, 320, 330 and 340 including a FLIP layer 320 inside the fluid surface and a PIC layer 330 as shown in FIG. 3. Thus, the fluid simulation method according to an embodiment of the present invention can reduce the number of particles by dividing the fluid into several regions and deploying particles differently to each region.

In a particular embodiment of the present invention, the FLIP layer, in which FLIP particles are deployed, may be from the fluid surface, where a level set value φ is 0, to the thin layer where a level set value φ is −2Δx (Δx is an interval of one point). As shown in FIG. 3, FLIP particles may be deployed only to the FLIP layer 320. Here, when the FLIP particles get out of the FLIP layer with the particle-based advection, those particles can be treated according to a predetermined setting. For example, FLIP particles flying out of the level set surface can be let go in order to provide showy splash effect, while FLIP particles can be dragged into the inside the level set to provide flat water surface.

When the FLIP particles get out of the water surface, they move with their own velocities due to the gravity in the region 310, while the FLIP particles get into from the FLIP layer 320, they can be treated as PIC particles having PIC properties in the PIC layer 330 which is the region between −2Δx and −4Δx. The particles in the region 340, of which the level set value φ is less than −4Δx, are deleted not to be deployed. Accordingly, the fluid simulation according to the present invention is performed by being divided into 4 layers of the layer 310, in which particles move their own movement, the FLIP particle layer 320, the PIC particle layer 330, and the layer 340 in which the particles are deleted. Redeploying (S140), projection (S150), particle velocity updating (S160) of the particles of FIG. 1 can be conducted for each layer.

The PIC particles in the PIC layer move with the grid-based velocity so that the particles which are deviated from the FLIP layer 320 can move naturally with the level set velocity.

The step of updating particle velocity of S160 will be explained in more detail below.

The particle velocity is transferred on a grid to maintain the incompressibility of the particles.

$$u^*(x) = \frac{\sum_i u_i w_i}{\sum_i w_i} \qquad \text{[Equation 7]}$$

$$u_i^{n+1} = \alpha_{flip}(u_i^n + u^*(p_i) - u(p_i)) + (1 - \alpha_{flip})u(p_i) \qquad \text{[Equation 8]}$$

A velocity of the grid of the FLIP particles may be determined with Equation 7. $u^*(x)$ is the velocity of the grid, $u_i$ is the velocity of each FLIP particle, and $w_i$ is a weighting value for the FLIP particle to affect to x position in which the weighting value can be calculated by the linear interpolation.

Velocity of the grid is updated with Equation 7 in which the velocity only near the level set surface is updated since the FLIP particles exist only near the level set surface (e.g. FLIP layer).

According to the present invention, the velocity near the level set surface may be used for the neighboring level sets. The extension velocities for the neighboring level sets can be seen in 'The fast construction of extension velocities in level set methods,' (Journal of Computational Physics, vol. 148, no. 1, pp. 2-22, 1999 proposed by D. Adalsteinsson and J. A. Sethian.

When $u^*(x)$ is updated with Equation 7, a velocity field $u(x)$ applied with incompressibility is obtained through the projection process of S150. The velocity of each FLIP particle is updated with Equation 8 in which $u_i$ is a particle velocity and $p_i$ is a particle position. Velocity changes between before and after the projection process are determined through the term of $u_i^n + u^*(p_i) - u(p_i)$ and also indicate how much of velocity should be applied to the particles to keep the incompressibility of the FLIP particles. $u_i^{n+1}$ is determined by $\alpha_{flip}$ in which $\alpha_{flip}$ is a value between 0 and 1. The velocity of the FLIP particle becomes higher as the value of $\alpha_{flip}$ increases and the velocity of $u(p_i)$ becomes higher as the value of $\alpha_{flip}$ decreases. When $\alpha_{flip}$ is 0, the velocity of the FLIP particle is $u(p_i)$ so that it becomes the same as that of the PIC particle. Thus, it is noted that properties of the FLIP and the PIC particle can be controlled by controlling $\alpha_{flip}$.

Figure 4:
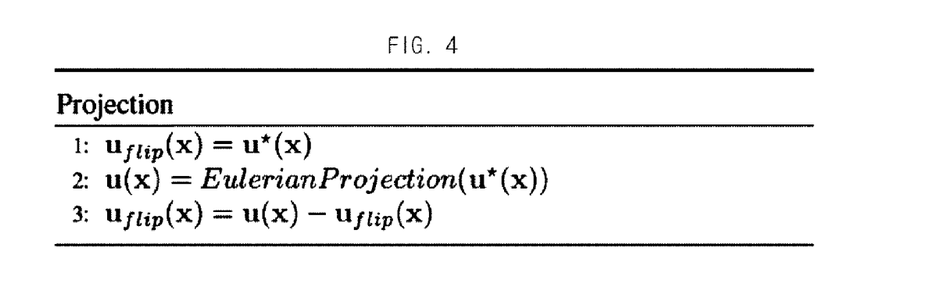
FIG. 4 illustrates an example of a projection process.

The algorithm in FIG. 4 illustrates the projection process of S150 in which $u_{flip}(x)$ is velocity changes between before and after the projection. The updating the particle velocity can be performed by using $u_{flip}(x)$ in S160.

As described above, in the fluid simulation method according to an embodiment of the present invention, the fluid is divided into 4 layers and particles in each layer move differently. Therefore, treating method of particles in each layer can be different each other.

Figure 5:
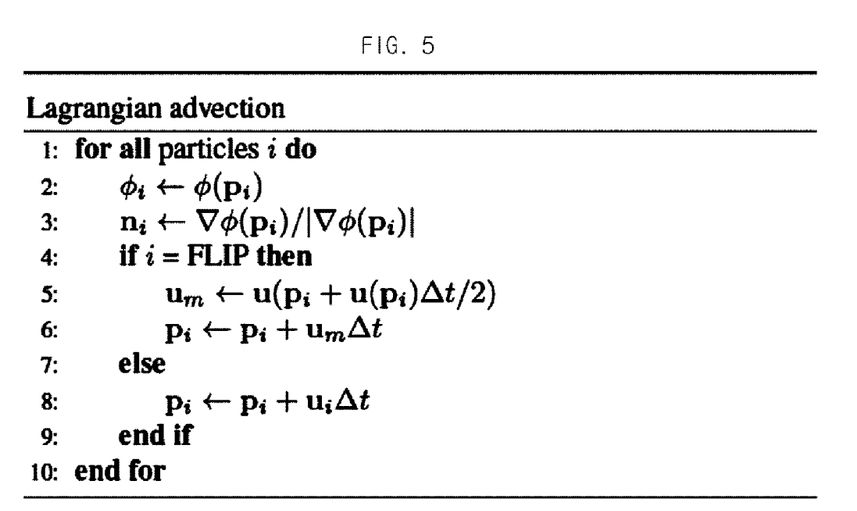
FIG. 5 illustrates an example of advection.

The algorithm in FIG. 5 illustrates the particle advection process.

Referring to FIG. 5, positions of the particles only in the FLIP layer are updated by using the Runge Kutta-second-order method (line 4 to line 6). Since the FLIP layer is the level set surface, it improves accuracy when the advection of the particles is processed with the Runge Kutta method.

Figure 6:
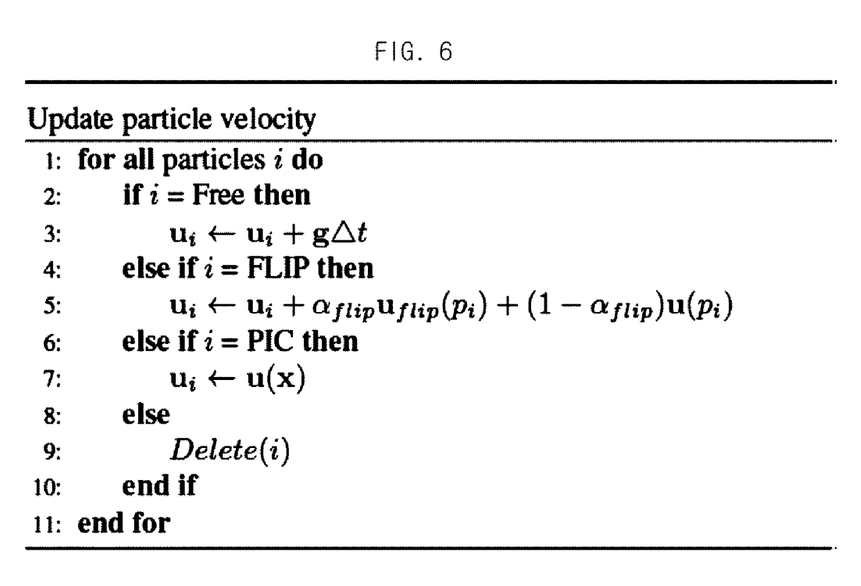
FIG. 6 illustrates an example of updating particle velocity.

The algorithm in FIG. 6 illustrates the updating process of velocities of the particles.

As shown in the algorithm in FIG. 6, each region of the region 310 (line 2, 3), the region 320 (line 4, 5), the region 330 (line 6, 7), the region 340 (line 8, 9) in FIG. 3, is updated differently each other. The term 'Free' in the algorithm in FIG. 6 means particles out of the water layer (the region 310 in FIG. 3) and thus the velocity is updated by employing the gravitational acceleration. On the other hands, the particles, which are below $-4\Delta x$ (the region 340 in FIG. 3), are deleted (any particle is not deployed).

In the fluid simulation method according to an embodiment of the present invention, 30 particles are deployed in each grid point. Here, each grid point in the FLIP layer has to have 30 particles. However, the number of particles can be more or less than the determined number during the particle advection process. Accordingly, the number of particles can be controlled by adding particles by generating random positions or deleting by selecting particles randomly in the grid point.

A method for reconstructing the level set surface of S130 of FIG. 1 will be explained in more detail below.

The fluid simulation method according to an embodiment of the present invention may reconstruct the level set surface by combining the level set method and the FLIP particle method. This reconstruction is effective to represent smooth surface of fluid with using FLIP particles and further makes the surface of fluid be smooth or rough by representing particles in detail.

As described above, particles have level set information and the level set surface is reconstructed according to the information. Each particle has level set information of a distance value of $\phi_i$ and a normal value of $n_i$.

The reconstruction of the level set surface begins with determining average position of the FLIP particles $\bar{p}$ based on the center of the grid points:

$$\bar{p}(x) = \sum_i w_i p_i \qquad \text{[Equation 9]}$$

$$\bar{\phi}(x) = |\bar{p}(x) - x| - r_0 \qquad \text{[Equation 10]}$$

wherein $p_i$ is a position of the FLIP particles present within radius $r_0$ from x position and $w_i$ is a weighting value to affect to $p_i$ from x position for which calculation the unit Spline Kernel function can be used.

A level set value $\bar{\phi}(x)$ can be obtained using x which is the position of the grid point center, an average particle position $\bar{p}$ and a radius $r_0$ with Equation 10. However, the reconstruction using Equation 10 may be difficult to obtain smooth surface unless the particles are distributed densely on the surface.

Generally, since there are gaps between particles, such general reconstruction methods do not provide smooth surface of fluid. Thus, the fluid simulation method according to an embodiment of the present invention provides level set information of a distance value and a normal value for each FLIP particle to compensate this problem. When the level set surface is reconstructed by using such level set information, it is able to provide smooth surface through the following processes.

Figure 7:
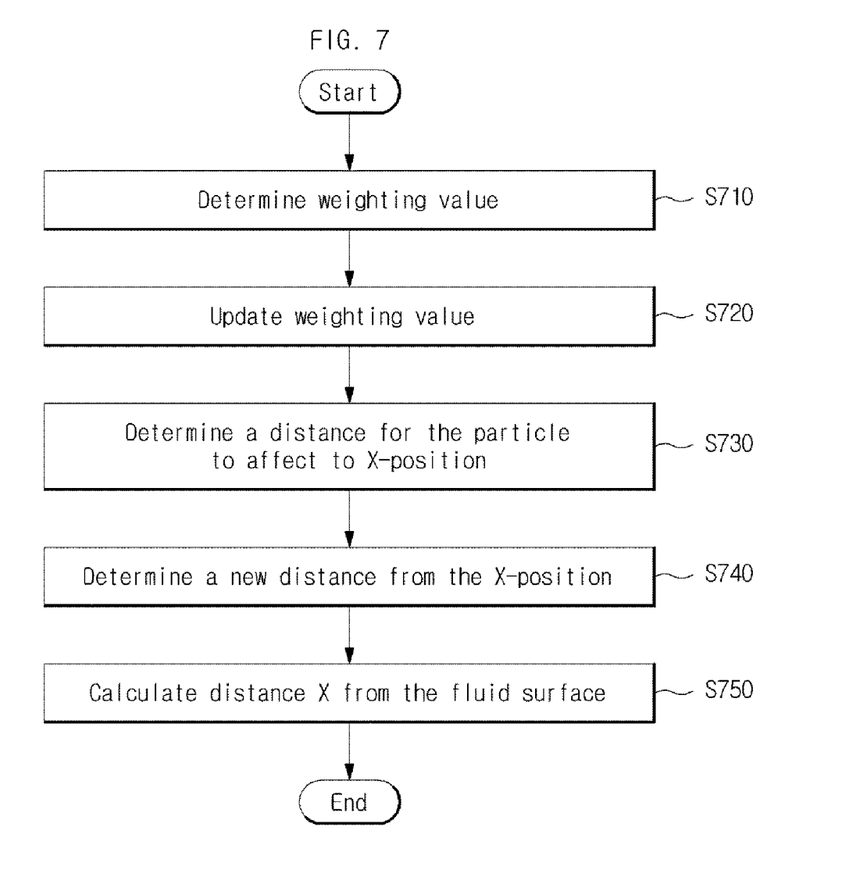
FIG. 7 is a flowchart illustrating a method for reconstructing the surface of level set in a fluid simulation method according to an embodiment of the present invention.

FIG. 7 is a flowchart illustrating a method for reconstructing the surface of level set in a fluid simulation method according to an embodiment of the present invention.

The reconstruction of level set surface may comprise determining a weighting value affecting of a FLIP particle position $\bar{p}$ to a position x in a grid (S710); updating the weighting value to a new weighting value based on the determined weighting value in S710 (S720); determining a distance to affect for the particle to a position x (S730); determining a new distance from the position x; and determining a distance from the fluid surface (S750).

The process from S710 to S750 can be represented by the following Equation 11 to Equation 16.

$$w_i = \left(\frac{1}{\varepsilon^2} + \frac{|x - \bar{p}(x)|}{r_0}\right)^2 \quad \text{[Equation 11]}$$

$$\tilde{w}_i = \max\left(\frac{x - \bar{p}(x)}{|x - \bar{p}(x)|} \cdot n_i, 0\right) w_i(x) \quad \text{[Equation 12]}$$

$$\tilde{\phi}_i = \min(\phi_i, \phi_0) - n_i \cdot (p_i - x) \quad \text{[Equation 13]}$$

$$\tilde{\phi}(x) = \frac{\sum_i \tilde{w}_i \tilde{\phi}_i}{\sum_i \tilde{w}_i} \quad \text{[Equation 14]}$$

$$\phi(x) = (1-\alpha)\phi(x) + \alpha\tilde{\phi}(x) \quad \text{[Equation 15]}$$

$$\alpha = \min\left(\frac{|u(x)|}{u_{max}}, \alpha_{max}\right) \quad \text{[Equation 16]}$$

In Equation 11, $w_i$ is a weighting value affecting of a FLIP particle position $\bar{p}$ to a position x in a grid and the weighting value can be controlled by controlling $\varepsilon$ value.

In Equation 12, which is an equation to obtain a new weighting value of $\tilde{w}_i$, $n_i$ is a normal of each particle. The weighting values of particles can be increased to have similar direction to the vector from $\bar{p}$ to x by using the inner product calculation of vector $\bar{p}$ to x, in which $\bar{p}$ is an average position of particles, and $n_i$ vector. When the value from the inner product calculation is negative in Equation 12, the particle vector is the vector from another surface and the distance which the particle has is also a distance from another surface so that the weighting value is 0 and has no effect to calculate x value of the particle.

Figure 8:
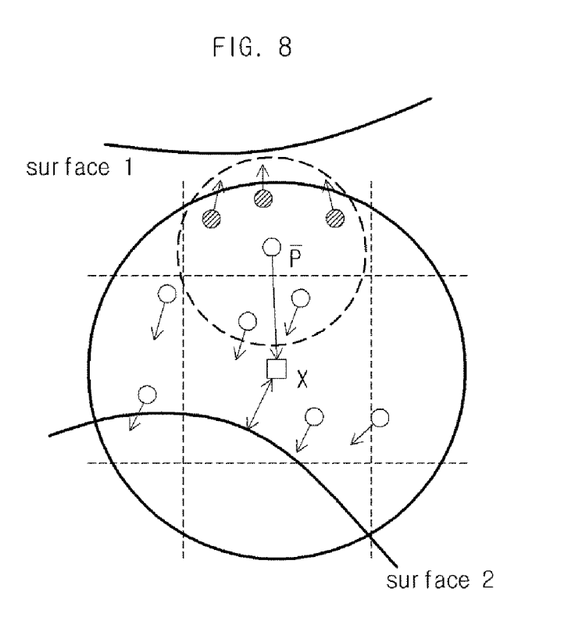
FIG. 8 illustrates a method for calculating level set value of x-position from FLIP particles.

Referring to FIG. 8 illustrating a method for calculating level set value of x position from FLIP particles, point x is closer to the surface 2 and should have a distance and a normal value based on the surface 2. x can have proper level set information when it is affected from particles having $\phi_i$ and $n_i$ based on the surface 2. When the value is calculated by using Equation 12, the value of blank circle particles based on the surface 2 is much higher than that of dashed circle particles based on the surface 1 so that x can have level set information based on the surface 2.

A distance $\tilde{\phi}_i$ which affects x-position of particles can be obtained with Equation 13. $\tilde{\phi}_i$ in Equation 13 is a distance projected to $n_i$ vector and $\phi_i$ is a distance of the particle from the fluid surface. $\phi_0$ is the minimum distance of the particle which means a distance from the surface of the particle to the center. When radius of the particle is $r_i$, $\phi_0$ can be $-r_i$.

In an embodiment of the present invention, $\phi_0$ is used as $-\Delta x$ and the deepest distance from the fluid surface can be calculated by comparing $\phi_0$ and $\sigma_i$. $\tilde{\phi}_i$ which is a distance from the fluid surface is calculated from x on the basis of the minimum distance.

A new distance $\tilde{\phi}(x)$ from x to the fluid surface is calculated by employing $\tilde{\phi}_i$ and the value $\tilde{w}_i$ for each particle for x in Equation 14.

A final distance $\phi(x)$ from x to the fluid surface is determined by combining the original distance $\bar{\phi}$ form x position and the new distance $\tilde{\phi}$ calculated by the particle in Equation 15. $\alpha$ is a variable determined with a ratio of $\bar{\phi}$ and $\tilde{\phi}$, and has a value between 0 and 1. Here $\alpha$ can be determined in various methods. For example, $\alpha$ value can be selected based on the velocity of the fluid.

In Equation 16, $\alpha$ value is calculated based on the velocity of the fluid. u(x) is a velocity of water at x position, $u_{max}$ is a predetermined maximum velocity, and $\alpha_{max}$ is the maximum value of the maximum $\alpha$. The $\alpha$ value is calculated with $$\frac{|u(x)|}{u_{max}}$$

and the calculated $\alpha$ cannot be higher than $\alpha_{max}$. When $\alpha$ is calculated by using Equation 16, the $\alpha$ value becomes low at the region where flow velocity is low so that $\bar{\phi}$ in Equation 15 becomes more important. Level set deformation by the FLIP particles is finally small so that it has tendency to maintain the original level set value to provide smooth surface. On the other hand, when the $\alpha$ value increases at the region where flow velocity is fast so that $\tilde{\phi}$ becomes more important. The level set by the FLIP particles is recalculated to provide rough surface of water. That is, various scales of fluid according to the velocity can be controlled by controlling the ratio of $\bar{\phi}$ and $\tilde{\phi}$ of the $\alpha$ variable.

FIG. 9 illustrates an example of level set surface reconstruction

In the grid-based fluid simulation, the higher resolution of the grid the better quality of simulation result can be obtained. However, since simulation with high resolution requires large amounts of calculations and resources, it causes poor performance and low productability. Upsampling, which is one of techniques to overcome this problem, is a method to convert a low-resolution data into its high-resolution data by controlling weighting function.

The fluid simulation method according to an embodiment of the present invention introduces this upsampling method to the level set surface reconstruction method to improve the quality of simulation. Prior to the level set surface reconstruction, the linear interpolation for the level set and the velocity field is performed and upsampling is performed. Processes from Equation 11 to Equation 15 are then performed using the upsampled level set and velocity field. After obtaining the level set and the velocity field which are reconstructed on the upsampled grid, a downsampling process is performed using the linear interpolation to provide final $\phi(x)$ and u(x).

Figure 10:
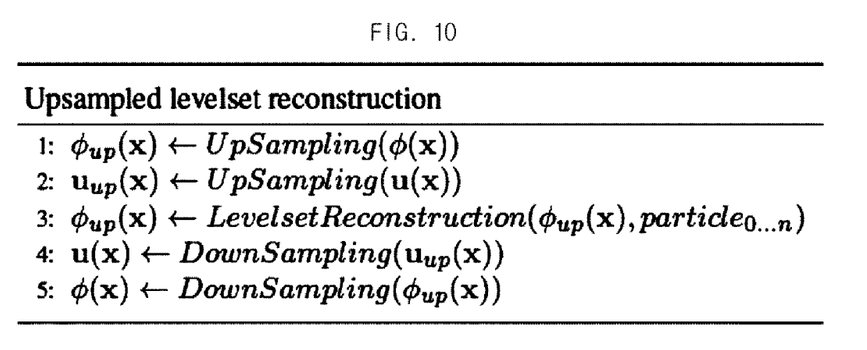
FIG. 10 illustrates an algorithm for improving quality of simulation by adding upsampling method.

FIG. 10 illustrates an algorithm for improving quality of simulation by adding upsampling method.

The upsampling method according to an embodiment of the present invention is not upsampling only through the linear interpolation but upsampling around the level set surface by the particles. Therefore, the higher the resolution of the grid the particles can be more precise so that the quality of the level set can be improved. And then the improved data is downsampled and applied to the simulation to increase overall quality of the simulation.

The fluid simulation method according to an embodiment of the present invention can be recorded in a storage medium by being implemented in the form of program instructions which can be executed through various means of processing information electronically. Examples of the storage medium include program instructions, data files, data structures or a combination thereof.

A program instruction recordable in a storage medium can be things specially designed or constructed or things known to those skilled in the software fields. Examples of the storage medium include magnetic media such as hard discs, floppy discs and magnetic tapes; optical media such as CD-ROMs and DVDs; magneto-optical media such as floptical discs, and hardward apparatus specially designed to store and execute program instructions such as ROM, RAM and flash memories. Furthermore, the above described medium can be transmission media such as optical or metallic wires, wave guides which include carrier wires transmitting signals specifying program instructions, data structures and the like. Examples of the program instruction include machine language codes produced by a compiler and high-level language codes executable by an apparatus such as computer which electronically processes information using an interpreter.

The hardware apparatus can be constructed to be operated as one or more of software modules capable of performing operation of the present invention and can include a processor which is designed to perform each step of the fluid simulation method according to an embodiment of the present invention.

Although the present invention has been described through a certain embodiment, it shall be appreciated that there can be a variety of modifications and permutations of the present invention by a person of ordinary skill in the art to which the present invention pertains without departing from the technical ideas and scope of the present invention that shall be defined by the claims appended below.

What is claimed is:

1. A fluid simulation method comprising:
setting initial conditions of level set and velocity field for a simulation object and setting FLIP particles according to the set initial condition of the level set and the set initial condition of the velocity field;
updating the level set and the velocity field by advection of the level set and the velocity field;
reconstructing the updated level set and the updated velocity field;
redeploying the FLIP particles for the simulation object;
projecting the updated velocity field to have incompressibility; and
updating velocity of each of the deployed particles.

2. The fluid simulation method of claim 1, wherein the redeploying step comprises dividing the simulation object into 4 regions and redeploying the FLIP particle differently for each region.

3. The fluid simulation method of claim 2, wherein the 4 regions are configured to include a first region which is an outside region affected by the gravity on the basis of a fluid surface, a second region which is formed inside the fluid surface as a layer having a constant distance from the fluid surface, a third region which is formed as a layer having a constant distance from the bottom of the second region, and a fourth region which is formed at the bottom of the third region.

4. The fluid simulation method of claim 3, wherein FLIP particles are deployed to the second region and are not deployed to the fourth region.

5. The fluid simulation method of claim 1, wherein each of the FLIP particles has level set information.

6. The fluid simulation method of claim 5, wherein the level set information comprises a level set value, a derivative of the level set value and a velocity field value.

7. The fluid simulation method of claim 6, wherein the updated level set and the updated velocity field is reconstructed based on the level set information stored in the FLIP particle.

8. The fluid simulation method of claim 1, wherein at the step of updating velocity, velocity of each of the deployed particles is updated based on difference in the velocity of each FLIP particle between before and after the projecting step.

9. A non-transitory computer readable recording medium recorded with a program performing a fluid simulation method, the fluid simulation method comprising:
setting initial conditions of level set and velocity field for a simulation object and setting FLIP particles according to the set initial condition of the level set and the set initial condition of the velocity field;
updating the level set and the velocity field by advection of the level set and the velocity field;
reconstructing the updated level set and the updated velocity field;
redeploying the FLIP particles for the simulation object;
projecting the updated velocity field to have incompressibility; and
updating velocity of each of the deployed particles.

10. A fluid simulation apparatus comprising a processor, wherein the processor:
sets initial conditions of level set and velocity field for a simulation object;
sets FLIP particles according to the set initial condition of the level set and the set initial condition of the velocity field;
updates the level set and the velocity field by advection of the level set and the velocity field;
reconstructs the updated level set and the updated velocity field;
redeploys the FLIP particles for the simulation object;
projects the updated velocity field to have incompressibility; and
updates velocity of each deployed particle.

* * * * *